(12) United States Patent
Jo et al.

(10) Patent No.: US 11,414,077 B2
(45) Date of Patent: Aug. 16, 2022

(54) DRIVING CONTROL METHOD USING TRAFFIC LIGHT INFORMATION AND VEHICLE FOR PERFORMING THE SAME

(71) Applicants: HYUNDAI MOTOR COMPANY, Seoul (KR); KIA MOTORS CORPORATION, Seoul (KR)

(72) Inventors: Kyu Hwan Jo, Yongin-si (KR); Hui Un Son, Suwon-si (KR); Jae Kyu Hyun, Daegu (KR); Seong Wook Moon, Seoul (KR); Do Hee Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 309 days.

(21) Appl. No.: 16/540,528

(22) Filed: Aug. 14, 2019

(65) Prior Publication Data
US 2020/0139969 A1    May 7, 2020

(30) Foreign Application Priority Data

Nov. 1, 2018  (KR) .................. 10-2018-0132809

(51) Int. Cl.
*B60W 30/18*  (2012.01)
*B60W 10/04*  (2006.01)
*G08G 1/095*  (2006.01)

(52) U.S. Cl.
CPC ............ *B60W 30/18* (2013.01); *B60W 10/04* (2013.01); *G08G 1/095* (2013.01);
(Continued)

(58) Field of Classification Search
CPC .. B60W 30/18; B60W 10/04; B60W 2555/60; B60W 30/18072;
(Continued)

(56) References Cited

U.S. PATENT DOCUMENTS 4,390,951 A  *  6/1983  Marcy .................... G08G 1/08
                                                    340/914
4,847,618 A  *  7/1989  Baustin .................. G08G 1/096
                                                    340/916
(Continued)

FOREIGN PATENT DOCUMENTS

JP      2008-296798 A    12/2008
JP      2010-196494 A     9/2010
(Continued)

*Primary Examiner* — B M M Hannan
(74) *Attorney, Agent, or Firm* — Lempia Summerfield Katz LLC

(57) ABSTRACT

A method of guiding driving with low fuel efficiency using traffic light information includes: acquiring traffic light information on a forward traffic light, determining whether the vehicle is capable of passing through the forward traffic light without stopping based on the traffic light information, a current vehicle speed, and available acceleration and deceleration speeds, and when the vehicle is capable of passing through it without stopping, outputting a guidance speed for enabling the vehicle to pass through the forward traffic light without stopping. In particular, the forward traffic light information includes information on a current signal of the traffic light and information on a remaining time until the current signal is changed to another signal.

19 Claims, 10 Drawing Sheets

(52) U.S. Cl.
CPC . *B60W 30/18072* (2013.01); *B60W 2520/105* (2013.01); *B60W 2555/60* (2020.02); *B60W 2720/106* (2013.01)

(58) Field of Classification Search
CPC ..... B60W 2520/105; B60W 2720/106; B60W 10/18; B60W 2720/10; B60W 2520/10; B60W 2720/103; B60W 2556/45; B60W 2554/802; B60W 50/0097; B60W 30/143; B60W 40/105; B60W 40/107; B60W 40/10; B60W 30/181; B60W 30/18154; G08G 1/095; G08G 1/0968; G08G 1/0967; G08G 1/096
USPC ...................................... 701/70, 79, 93, 119
See application file for complete search history.

(56) References Cited

U.S. PATENT DOCUMENTS

| | | | | |
|---|---|---|---|---|
| 2001/0034575 A1* | 10/2001 | Takenaga | ........... | B60K 31/0058 180/170 |
| 2011/0018701 A1* | 1/2011 | Mizuno | ........... | G08G 1/07 340/438 |
| 2012/0169517 A1* | 7/2012 | Cho | ........... | G08G 1/096783 340/932 |
| 2012/0239282 A1* | 9/2012 | Taguchi | ........... | G08G 1/096725 701/119 |
| 2013/0076538 A1* | 3/2013 | Uno | ........... | G08G 1/096716 340/905 |
| 2013/0110316 A1* | 5/2013 | Ogawa | ........... | G08G 1/096725 701/1 |
| 2013/0110371 A1* | 5/2013 | Ogawa | ........... | G08G 1/095 701/1 |
| 2014/0046581 A1* | 2/2014 | Ota | ........... | G08G 1/096775 701/408 |
| 2014/0222244 A1* | 8/2014 | Ogawa | ........... | G08G 1/096725 701/1 |
| 2015/0029039 A1* | 1/2015 | Mukaiyama | ........ | G08G 1/09675 340/905 |
| 2015/0262483 A1* | 9/2015 | Sugawara | ........... | G08G 1/0962 340/929 |
| 2016/0086486 A1* | 3/2016 | Maeda | ........... | G08G 1/0962 701/119 |
| 2017/0178508 A1* | 6/2017 | Chiu | ........... | G08G 1/09626 |
| 2018/0281802 A1* | 10/2018 | Oyama | ........... | B60W 30/18154 |
| 2020/0143674 A1* | 5/2020 | Wölfl | ........... | G08G 1/0129 |
| 2020/0361488 A1* | 11/2020 | Miura | ........... | G08G 1/166 |

FOREIGN PATENT DOCUMENTS

| | | |
|---|---|---|
| JP | 2010-244308 A | 10/2010 |
| JP | 2014-096012 A | 5/2014 |
| KR | 10-2010-0104793 A | 9/2010 |
| KR | 10-2014-0100804 A | 8/2014 |

* cited by examiner

FIG. 1 "PRIOR ART"

DRIVING CONTROL METHOD USING TRAFFIC LIGHT INFORMATION AND VEHICLE FOR PERFORMING THE SAME

This application claims priority to and the benefit of Korean Patent Application No. 10-2018-0132809, filed on Nov. 1, 2018, the entire contents of which are incorporated herein by reference.

FIELD

The present relates to a driving control method or a vehicle for performing the method using traffic light information.

BACKGROUND

The statements in this section merely provide background information related to the present disclosure and may not constitute prior art.

In general, a driver has a difficulty in accurately recognizing signal change timing of a forward traffic light during driving. Accordingly, the driver identifies the forward traffic light with the naked eye and drives a vehicle according to a traffic signal at a time point at which the traffic light is identified, which is described with reference to FIG. 1.

FIG. 1 is a diagram showing an example of a general driving manner of a driver depending on a state of a traffic light. In FIG. 1, the horizontal axis indicates a driving distance to the traffic light from a current position and the vertical axis indicates a vehicle speed.

Referring to FIG. 1, when a forward traffic light 120 is a green signal when a vehicle 110 is driven, the driver tends to maintain driving at a fixed speed as long as other driving environments are not changed. Then, when the driver first recognizes, at a point 131, that the traffic light changes from a green signal to an yellow signal as approaching the traffic light 120, the driver may gradually reduce the speed, and when the driver later recognizes the signal change to a red signal at a point 132, the driver may suddenly reduce the speed in order to stop the vehicle at a position of the traffic light 120. Accordingly, when recognition of the signal change to a red signal is delayed, fuel efficiency is degraded due to such a sudden deceleration.

In addition, when the forward traffic light is already a red signal from at a time point at which the driver first recognizes the traffic light, the driver reduces the speed in order to stop the vehicle in front of the traffic light, but when the traffic light is changed to a green signal before the vehicle reaches the traffic light, unnecessary deceleration is already performed and, thus, fuel efficiency is degraded.

We have discovered that such degradation of fuel efficiency more frequently occurs in a downtown area or national highway in which traffic lights are disposed at a relatively narrow interval.

SUMMARY

Accordingly, the present disclosure is directed to a driving control method using traffic light information and a vehicle for performing the same so as to improve the fuel efficiency.

The present disclosure provides a vehicle and a driving control method thereof, for preventing unnecessary acceleration and deceleration based on signal change to enhance fuel efficiency.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a method of controlling a vehicle includes: acquiring, by a communication unit, traffic light information on a forward traffic light; determining, by a processor, whether the vehicle is capable of passing through the forward traffic light without stopping based on the traffic light information, a current vehicle speed of the vehicle, and available acceleration and deceleration speeds of the vehicle; and when the vehicle is capable of passing through the forward traffic light without stopping, outputting, by the processor, a guidance speed for enabling the vehicle to pass through the forward traffic light without stopping. In particular, the forward traffic light information includes at least information on a current signal of the traffic light and information on a remaining time until the current signal is changed to another signal indicating a change in a passability of the vehicle.

In another aspect of the present disclosure, a vehicle includes a communication unit configured to acquire traffic light information on a forward traffic light ahead of the vehicle, a traffic signal processor configured to determine whether the vehicle is capable of passing through the forward traffic light without stopping based on the traffic light information, a current vehicle speed of the vehicle, and available acceleration and deceleration speeds of the vehicle, and configured to determine a guidance speed for enabling the vehicle to pass through the forward traffic light without stopping, and an outputting unit configured to output the guidance speed, wherein the forward traffic light information includes at least information on a current signal of the traffic light and information on a remaining time until the current signal is changed to another signal indicating a change in a passability of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
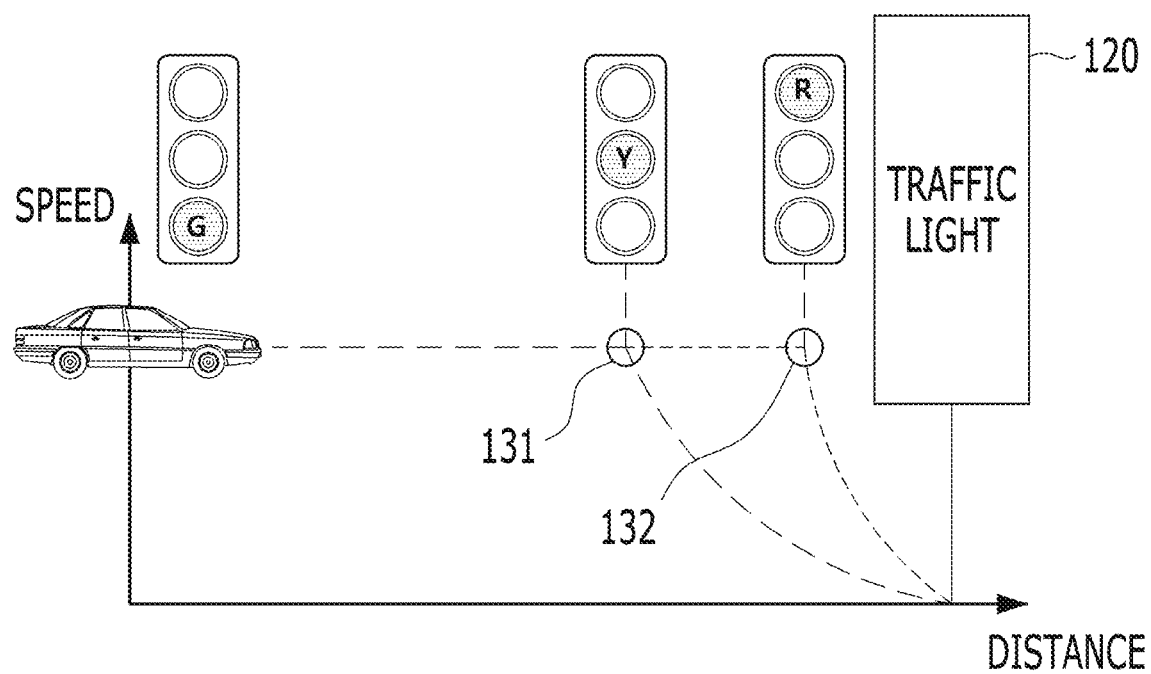
FIG. 1 is a diagram showing an example of a general driving manner of a driver depending on a state of a traffic light.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a detailed description of known functions and configurations that may unnecessarily obscure the subject matter of the present disclosure will be omitted.

In addition, when a certain part "includes" a certain component, this indicates that the part may further include another component instead of excluding another component unless there is no different disclosure. The same reference numbers will be used throughout the drawings and the specification to refer to the same parts.

According to one form of the present disclosure, whether a vehicle is capable of crossing a traffic light without stopping may be determined based on forward traffic light information including information on at least a time point at which a signal is changed, and when the vehicle is capable of crossing the traffic light without stopping, a passing speed with the lowest loss in fuel efficiency may be guided or, when the vehicle is not capable of crossing the traffic light without stopping, acceleration may be limited or deceleration may be guided, thereby enhancing fuel efficiency.

Figure 2:
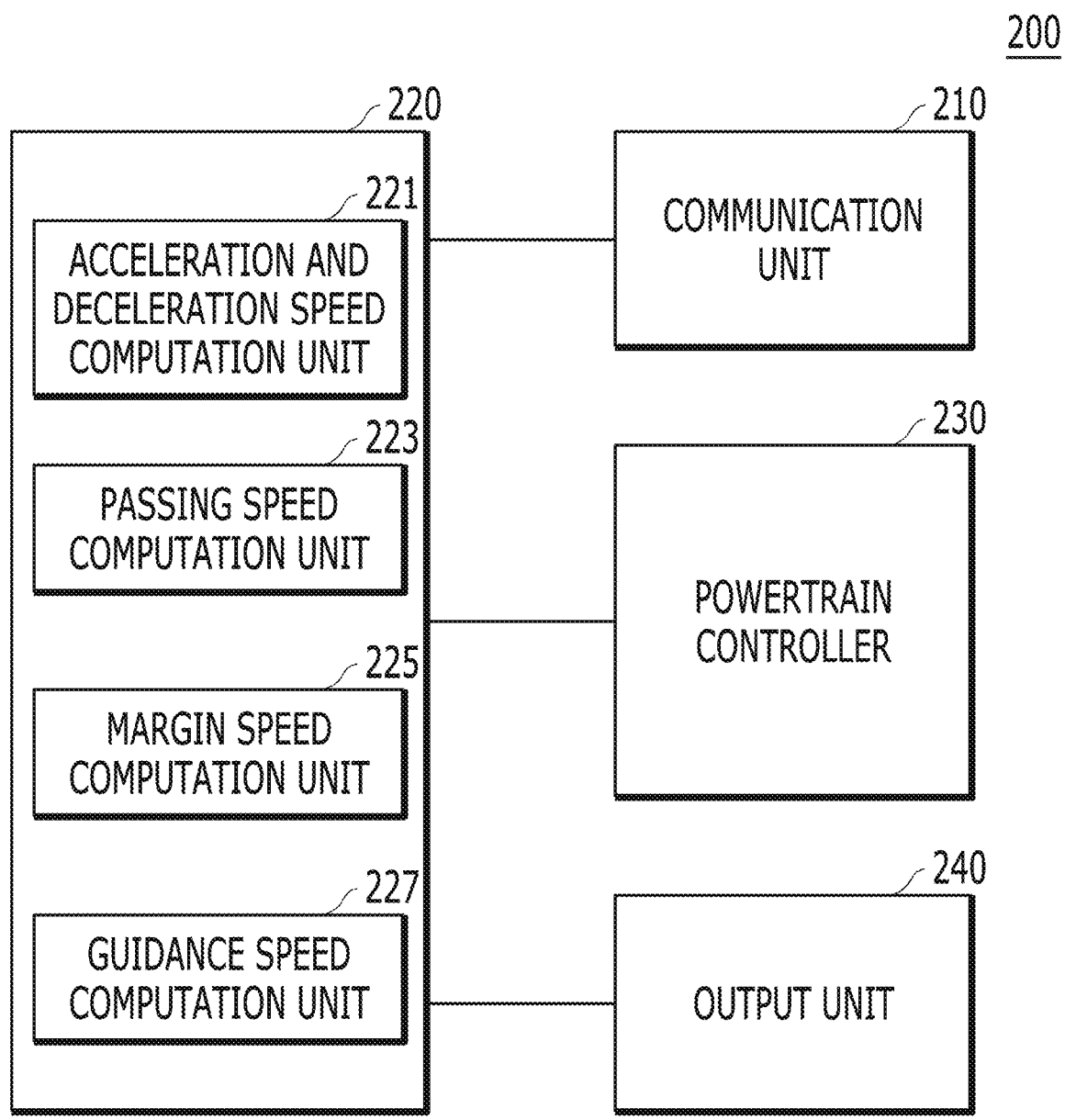
FIG. 2 is a block diagram showing an example of a configuration of a vehicle.

First, the configuration of a vehicle applicable to forms of the present disclosure will be described with reference to FIG. 2. FIG. 2 is a block diagram showing an example of a configuration of a vehicle according to one form of the present disclosure.

Referring to FIG. 2, a vehicle 200 may include a communication unit 210, a traffic signal processor 220, a powertrain controller 230, and an output unit 240. FIG. 2 illustrates only components related to the forms of the present disclosure, needless to say, an actual vehicle includes greater components than in the drawing.

First, the communication unit 210 may acquire forward traffic light information on a vehicle driving path (e.g., a traffic light signal ahead of the vehicle) by wire or wirelessly. To this end, the communication unit 210 may include a wireless communication module or a wired communication module. The wireless communication module may include MODEM for supporting 3G/4G/5G type data communication or a telematics module or may include a short-distance wireless communication module such as Wi-Fi, Bluetooth, or Zigbee. The wired communication module may include a universal serial bus (USB) module, but is not limited thereto.

The traffic light information acquired by the communication unit 210 may be acquired from an object around the path using a V2X method or may be acquired from a predetermined external object such as a telematics center or a traffic information server. The traffic light information may include at least one piece of information of a position of a traffic light, a type of a current signal, a type of a next signal, a remaining time up to next signal change, or a time point of next signal change.

The traffic signal processor 220 may determine whether a vehicle is capable of crossing the corresponding traffic light without stopping via available acceleration/deceleration or speed maintenance in a driving situation before the vehicle reaches the forward traffic light, based on the traffic light information acquired through the communication unit 210, may determine a target speed in consideration of fuel efficiency when the vehicle is capable of crossing the traffic light, and may transmit the determined speed information to the output unit 240. On the other hand, when determining that the vehicle is not capable of crossing the corresponding traffic light without stopping despite available acceleration/deceleration in a driving situation before the vehicle reaches the forward traffic light, the traffic signal processor 220 may determine to limit acceleration or to guide deceleration and may transmit information thereof to the powertrain controller 230. To this end, the traffic signal processor 220 may include an acceleration and deceleration speed computation unit 221 for computing a currently available acceleration or deceleration speed in the vehicle up to the traffic light, a passing speed computation unit 223 for computing a minimum or maximum available passing speed for enabling the vehicle to pass without stopping, a margin speed computation unit 225 for computing a margin speed based on the passing speed and the current vehicle speed, and a guidance speed computation unit 227 for computing a target speed guided to the driver for driving without stopping through the lowest loss in fuel efficiency may be guided or, when the vehicle is not capable of crossing. A detailed computing method of high-ranking components 221, 223, 225, and 227 of the traffic signal processor 220 will be described with reference to FIG. 3 and subsequent drawings.

When the traffic signal processor 220 determines that the vehicle is not capable of crossing the forward traffic light without stopping, the powertrain controller 230 may limit acceleration via torque line change or the like. For example, the powertrain controller 230 may include at least one of an engine management system (EMS), a motor control unit (MCU), or a hybrid control unit (HCU) according to the configuration of the vehicle powertrain.

The output unit 240 may output a guidance speed or deceleration guidance information in a predetermined form according to the determination of the traffic signal processor 220. For example, the output unit 240 may include a cluster, a display of an audio/video/navigation (AVN) system, or the like and may display a guidance speed, a deceleration guidance message, accelerator pedal releasing time point information, or the like. Needless to say, the output unit 240 may include a speaker to output sound corresponding to the displayed information.

Figure 3:
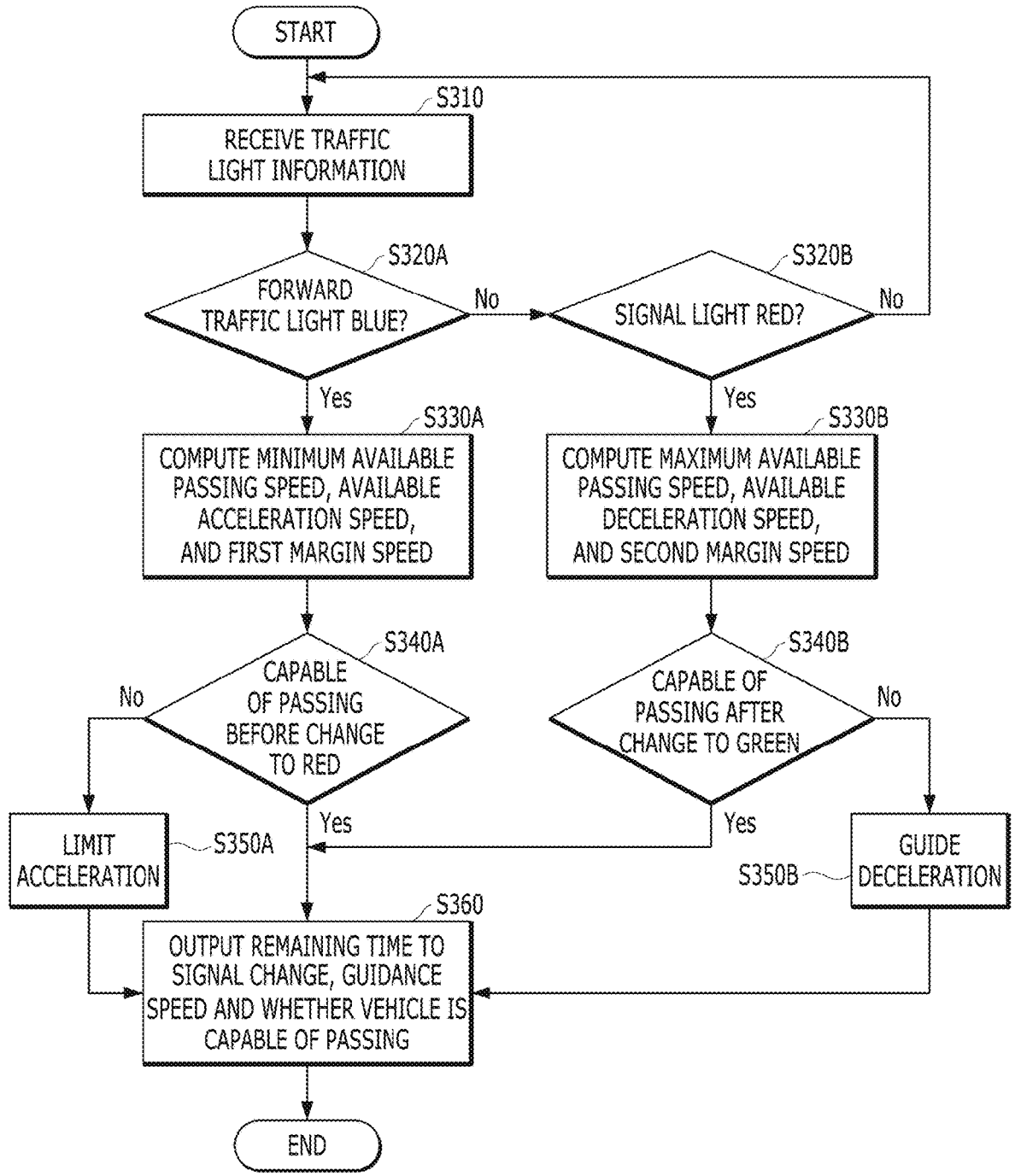
FIG. 3 is a flowchart showing an example of a procedure of guiding a vehicle to cross a traffic light using traffic light information in the vehicle.

Based on the aforementioned vehicle configuration, a guiding and driving control procedure using the traffic light information will be described with reference to FIG. 3. FIG. 3 is a flowchart showing an example of a procedure of guiding a vehicle to cross a traffic light using traffic light information in the vehicle according to one form of the present disclosure.

Referring to FIG. 3, first, traffic light information may be received through the communication unit 210 (S310). As described above, the traffic light information may include at least current signal information and remaining time information to next signal change. Here, the next signal may mean a signal indicating change in a passability of the vehicle (i.e., change from green to yellow, or from yellow to green light etc.).

When a forward signal is green (YES of S320A), the traffic signal processor 220 may compute a minimum available passing speed, an available acceleration speed, and a first margin speed (S330A).

As the computing result, when the vehicle is not capable of crossing the traffic light without stopping (i.e., the vehicle is not capable of crossing through the traffic light before the traffic light is change to a red signal) (NO of S340A), the traffic signal processor 220 may determine to limit acceleration (S350A).

On the other hand, when the forward signal is red (NO of S320A and YES of S320B), the traffic signal processor 220 may compute a maximum available passing speed, an available deceleration speed, and a second margin speed (S330B).

As the computing result, when the vehicle is not capable of crossing the traffic light without stopping (i.e., the vehicle is not capable of crossing the traffic light after the traffic light is changed to a green signal before the vehicle reaches the traffic light) (NO of S340B), the traffic signal processor 220 may determine to guide deceleration (S350B).

According to the aforementioned results of the procure (S340A, S340B, S350A, and S350B), corresponding information (e.g., a period with which a traffic light is changed/remaining time up to next signal change, whether a vehicle is capable of crossing a traffic light without stopping, and a guidance speed) may be output through the output unit 240 such as a cluster (S360). Simultaneously, when the vehicle is not capable of crossing a traffic light without stopping, acceleration may also be limited through the powertrain controller 230.

Hereinafter, information on a computing target of the traffic signal processor 220 will be described with reference to Table 1 below.

acceleration speed by a remaining time to traffic light change Ts, and the available deceleration speed may be obtained by multiplying the maximum deceleration speed by the remaining time to traffic light change Ts.

Here, the maximum acceleration speed and the maximum deceleration speed may be determined in consideration of vehicle performance, driver tendency, and a traffic situation. For example, upper limits of the maximum acceleration speed and the maximum deceleration speed may be dependent upon performance of a powertrain and performance of a brake system, respectively. However, the maximum acceleration speed and the maximum deceleration speed may be lowered than the upper limits when acceleration/deceleration tendency of the driver is mild. In addition, the maximum acceleration speed may be lowered not to exceed a speed limit of a current road when a current vehicle speed is added to the available acceleration speed, and the maximum deceleration speed may be lowered not to interrupt a current traffic flow. For example, when the upper limit of the maximum deceleration speed is applied and an average speed to the traffic light is remarkably lowered to a level compared with an average speed of surrounding vehicles to cause dissatisfaction of other drives, the maximum deceleration speed may be lowered.

The passing speed computation unit 223 may divide a remaining distance to the traffic light by the remaining time to traffic light change Ts to compute an available passing speed Vp. That is, the available passing speed Vp may be an average speed for enabling the vehicle to pass without stopping from a current position. For example, the available passing speed Vp may be obtained according to the equation "available passing speed (kph)=(remaining distance to traffic light (m))/(remaining time up to signal change (sec)) *3.6".

In this case, when the forward traffic light is currently green, if the vehicle is driven at the available passing speed Vp obtained using the above method, the traffic light becomes red at a time point when the vehicle reaches the traffic light and, thus, when the current vehicle speed is lower than the available passing speed Vp, the vehicle is not capable of crossing the traffic light without stopping and, thus, the available passing speed Vp may be a minimum available passing speed. In addition, when the forward traffic

TABLE 1

|  | Green color of forward traffic light | Red color of forward traffic light |
| --- | --- | --- |
| remaining time to traffic light change (Ts) | Remaining time before green light is turned off | Remaining time before green light is turned on |
| Available passing speed (Vp) | Minimum available passing speed for enabling vehicle to pass without stopping | Maximum available passing speed for enabling vehicle to pass without stopping |
| Available acceleration and deceleration speed (Va) | Maximum acceleration speed*Ts | Maximum deceleration speed*Ts |
| Margin speed (Vm) | Max((Vp-current vehicle speed), 0) | Max((current vehicle speed-Vp), 0) |

As shown in Table 1 above, the acceleration and deceleration speed computation unit 221 may compute an available acceleration and deceleration speed Va. The available acceleration and deceleration speed Va may include an available acceleration speed applied when the forward traffic light is green, and an available deceleration speed applied when the forward traffic light is red. The available acceleration speed may be obtained by multiplying the maximum light is currently red, if the vehicle is driven at the available passing speed Vp obtained using the above method, the traffic light becomes green at a time point when the vehicle reaches the traffic light and, thus, when the current vehicle speed is higher than the available passing speed Vp, the vehicle is not capable of crossing the traffic light without stopping and, thus, the available passing speed Vp may be a maximum available passing speed.

The margin speed computation unit 225 may obtain a margin speed based on a difference between the current speed and the available passing speed Vp.

In addition, the guidance speed computation unit 227 may determine whether the vehicle is capable of crossing the traffic light and may determine a guidance speed using a method shown in Table 2 below.

TABLE 2

|  | Green color of forward traffic light | Red color of forward traffic light |
|---|---|---|
| Passing available condition | Available acceleration and deceleration speed Va >= 2*margin speed (Vm) | Available acceleration and deceleration speed (Va) >= 2* margin speed (Vm) |
| Passing available condition | ※When the above condition is not satisfied, a guidance speed for enabling a vehicle to pass without stopping is not reached within a current period. | |
| guidance speed | Max (available passing speed(Vp), Vp + Vm) ※When current vehicle speed is higher than minimum available passing speed, guidance speed = minimum available passing speed | Min (available passing speed(Vp), Vp − Vm) ※When current vehicle speed is lower than maximum available passing speed *guidance speed = maximum available passing speed |

As shown in Table 2 above, commonly, when the forward traffic light is green and red, if the available acceleration and deceleration speed Va is twice or more than first/second margin speed Vm, the guidance speed computation unit 227 may determine that the vehicle is capable of crossing the traffic light without stopping. This is because a difference between the current vehicle speed and the available passing speed Vp is a margin speed and, thus, when the available acceleration and deceleration speed is twice or more than the margin speed, an average speed to a time point of crossing the traffic light from a current time point is adjusted to the available passing speed Vp.

Figure 4:
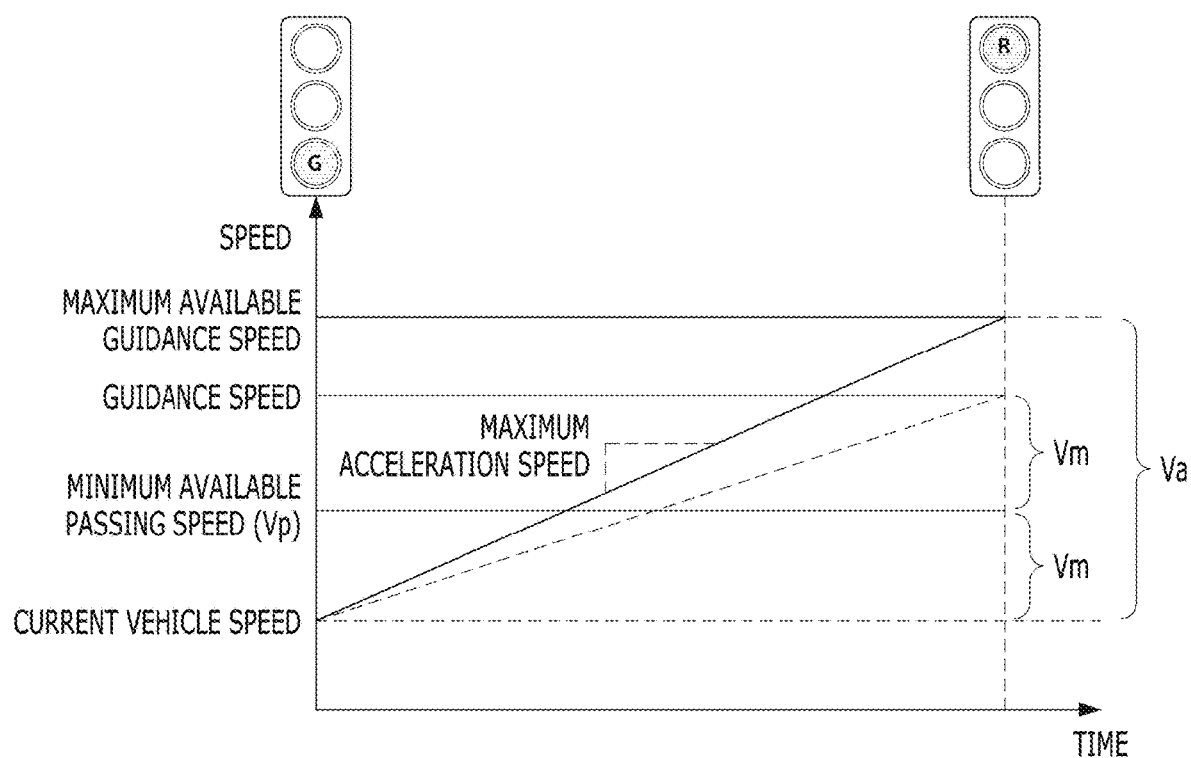
FIG. 4 is a diagram for explanation of a guidance speed for enabling a vehicle to pass without stopping when a forward traffic light is green.

When determining the vehicle is capable of crossing the traffic light without stopping, the guidance speed computation unit 227 may determine a guidance speed. For example, when the forward traffic light is green, the guidance speed may be determined as a greater value among the sum of the minimum available passing speed Vp and the first margin speed Vm and the minimum available passing speed Vp and, in this case, a guidance speed when the current vehicle speed is higher than the minimum available passing speed may be a minimum available passing speed, which will be described with reference to FIG. 4. FIG. 4 is a diagram for explanation of a guidance speed for enabling a vehicle to pass without stopping when a forward traffic light is green according to one form of the present disclosure.

Referring to FIG. 4, the maximum available guidance speed based on the maximum acceleration speed, that is, the available acceleration and deceleration speed Va is twice or more than the margin speed Vm and, thus, the guidance speed computation unit 227 may determine that the vehicle is capable of crossing the traffic light without stopping. The sum of the minimum available passing speed Vp and the first margin speed Vm is greater than the minimum available passing speed Vp and, thus, the guidance speed may be determined as the sum of the minimum available passing speed Vp and the first margin speed Vm.

Figure 5:
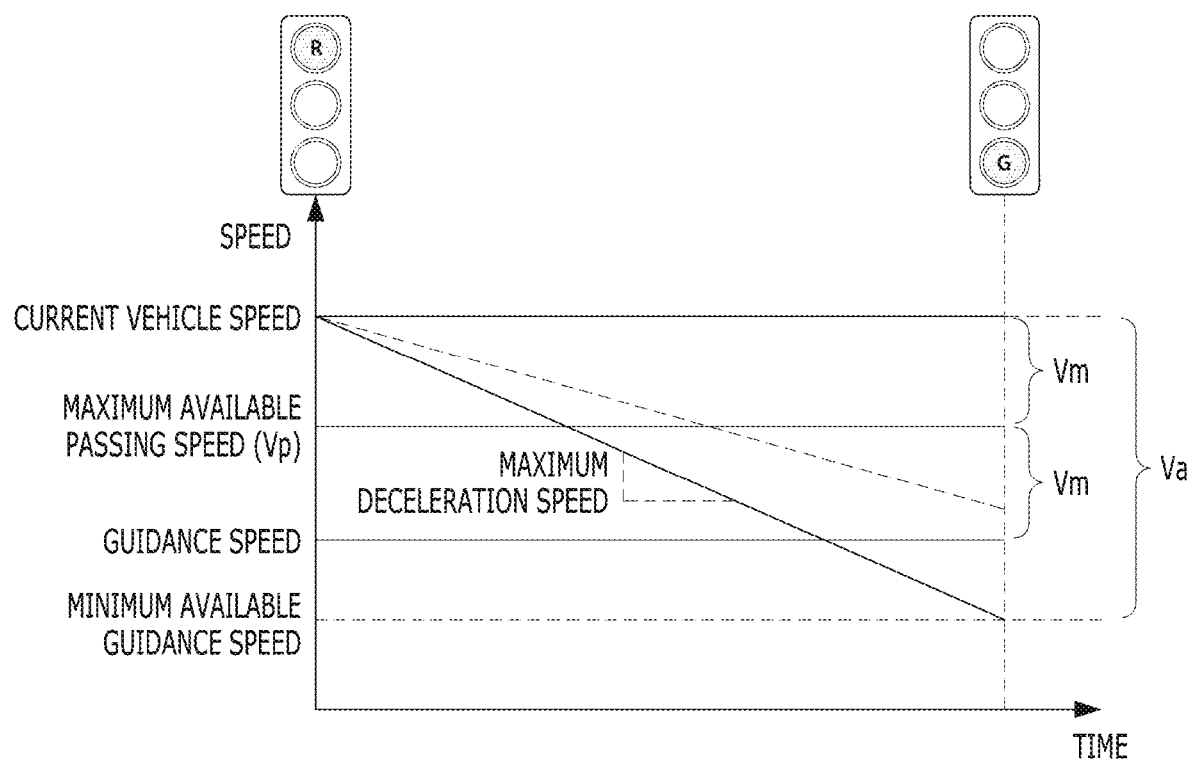
FIG. 5 is a diagram for explanation of a guidance speed for enabling a vehicle to pass without stopping when a forward traffic light is red.

On the other hand, when the forward traffic light is red, the guidance speed may be determined as a smaller value among a value obtained by subtracting the second margin speed Vm from the maximum available passing speed Vp and the maximum available passing speed Vp and, in this case, when a guidance speed when the current vehicle speed is lower than the minimum available passing speed may be a maximum available passing speed, which will be described with reference to FIG. 5. FIG. 5 is a diagram for explanation of a guidance speed for enabling a vehicle to pass without stopping when a forward traffic light is red according to one form of the present disclosure.

Referring to FIG. 5, the minimum available guidance speed based on the minimum acceleration speed, that is, the available acceleration and deceleration speed Va is twice or more than the margin speed Vm and, thus, the guidance speed computation unit 227 may determine that the vehicle is capable of crossing the traffic light without stopping. The value obtained by subtracting the second margin speed Vm from the maximum available passing speed Vp is smaller than the maximum available passing speed Vp and, thus, the guidance speed may be determined as the value obtained by subtracting the second margin speed Vm from the maximum available passing speed Vp.

As described above, as the vehicle is determined to be capable of crossing the traffic light without stopping, the determined guidance speed may be output through the output unit, which will be described with reference to FIG. 6.

Figure 6:
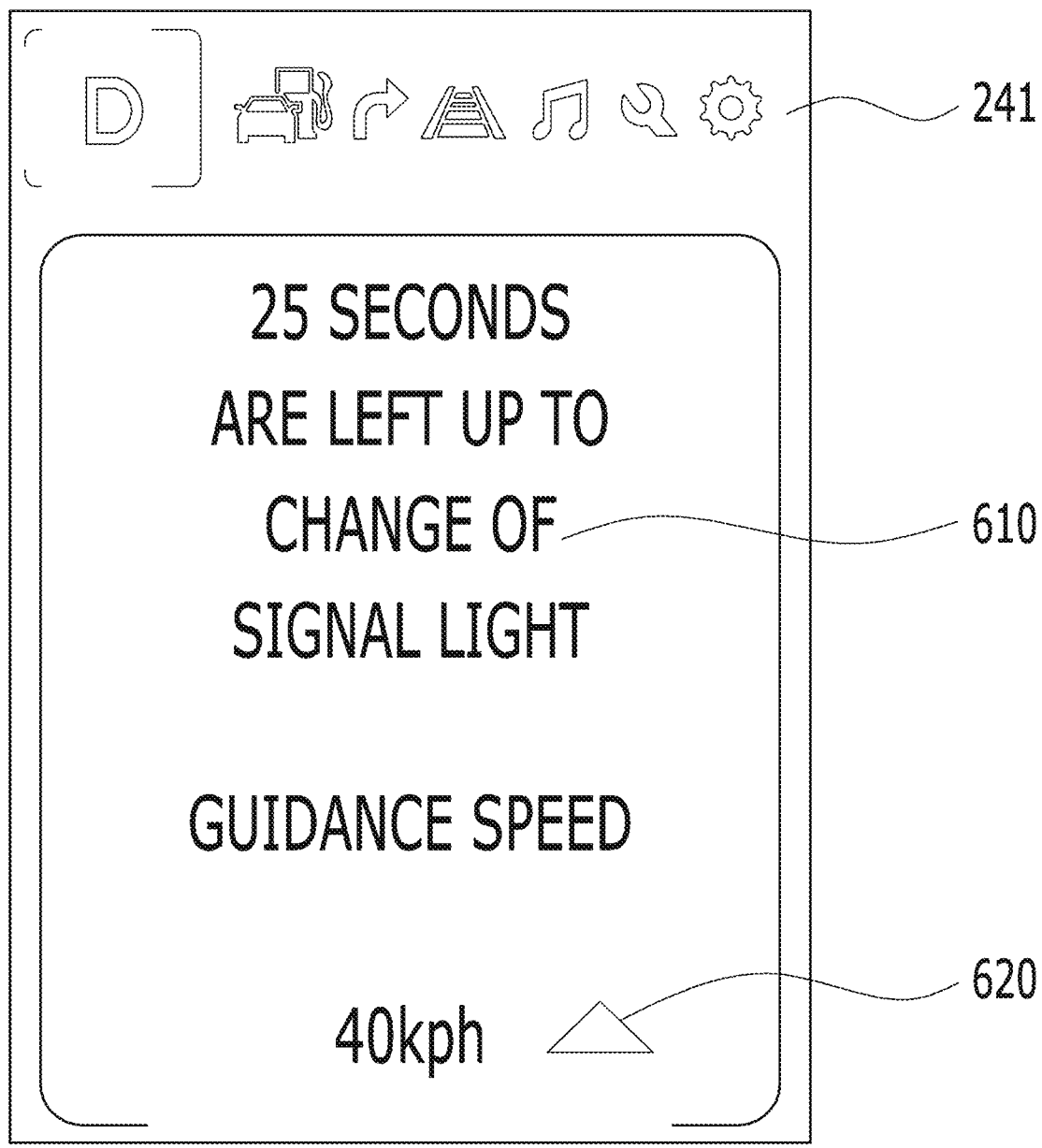
FIG. 6 is a diagram showing an example of the form for outputting a guidance speed.

FIG. 6 is a diagram showing an example of the form for outputting a guidance speed according to one form of the present disclosure.

Referring to FIG. 6, information of remaining time to signal change 610 and a guidance speed 620 may be displayed on one region of a cluster 241. A driver may control a vehicle with reference to such information and, thus, unnecessary acceleration and deceleration may be prevented to enable the vehicle to cross the traffic light.

Hereinafter, the case in which a vehicle is not capable of crossing a traffic light without stopping will be described with reference to FIGS. 7 to 10.

Figure 7:
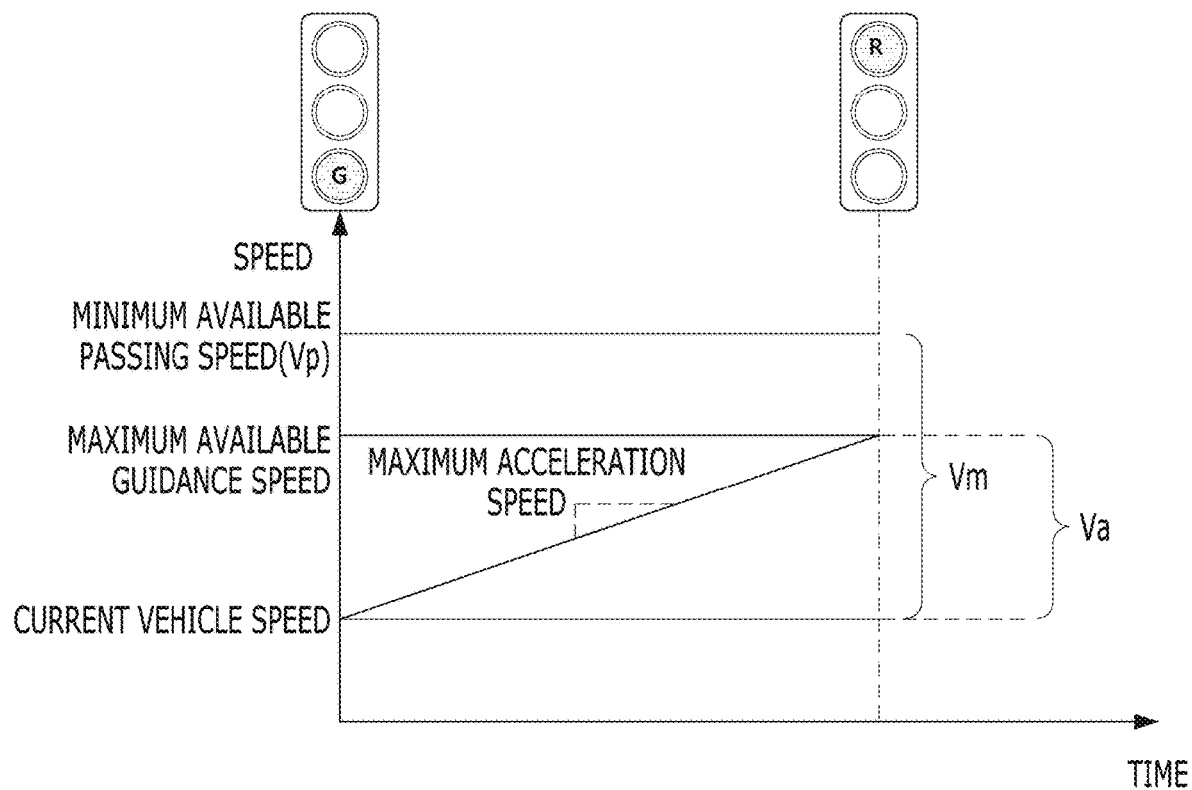
FIG. 7 is a diagram for explanation of the case in which a vehicle is not capable of passing without stopping when a forward signal is green.

FIG. 7 is a diagram for explanation of the case in which a vehicle is not capable of crossing a traffic light without stopping when a forward signal is green according to one form of the present disclosure.

Referring to FIG. 7, the maximum available guidance speed based on the maximum acceleration speed, that is, the available acceleration and deceleration speed Va is less than twice of the margin speed Vm and the minimum available passing speed is greater than the current speed and the maximum available acceleration speed and, thus, the guidance speed computation unit 227 may determine that the vehicle is not capable of crossing the traffic light without stopping. In this case, with reference to FIG. 6, the aforementioned cluster 241 may output a message for guiding deceleration.

In this situation, the powertrain controller 230 may limit acceleration, which will be described with reference to FIG.

Figure 8:
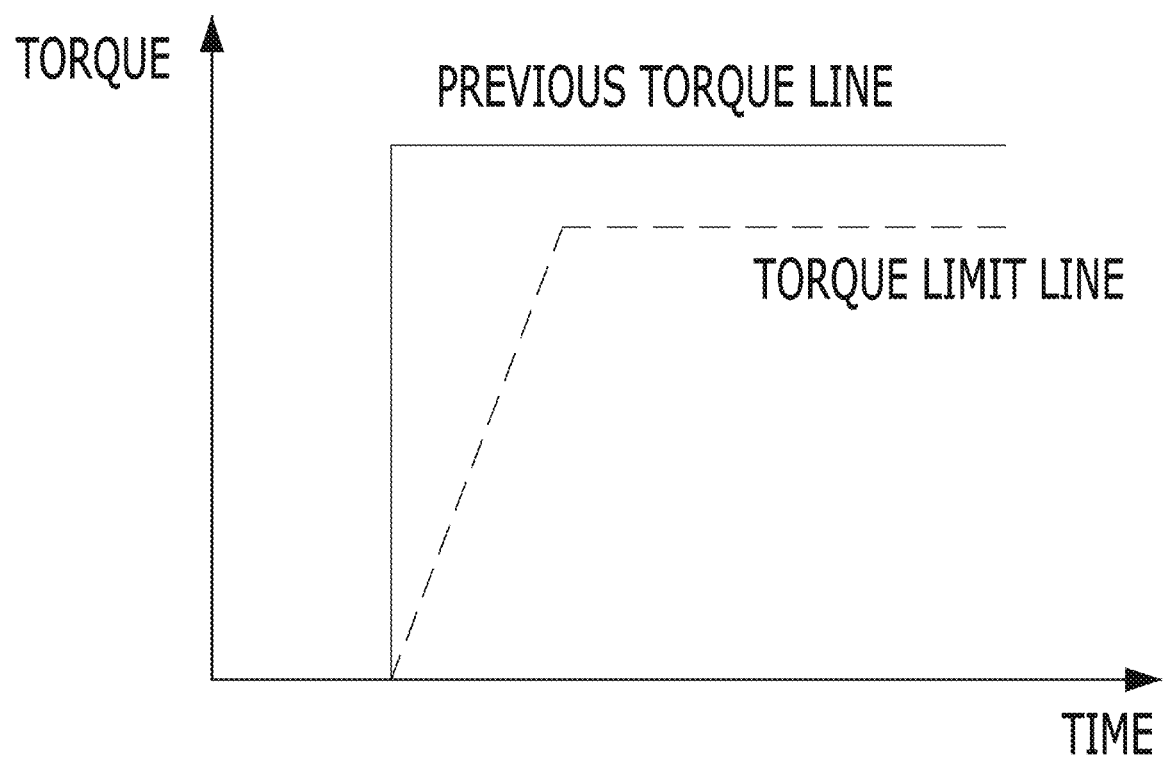
FIG. 8 is a diagram showing an example of a graph of limiting acceleration by a powertrain controller.

8. FIG. 8 is a diagram showing an example of a graph of limiting acceleration by a powertrain controller according to an exemplary form of the present disclosure.

Referring to FIG. 8, when an accelerator pedal sensor (APS) value is constant, torque corresponding to the APS value is output through a powertrain at ordinary time but, when the vehicle is not capable of crossing a traffic light without stopping, the powertrain controller 230 may apply a torque limit line to limit acceleration. In this case, the torque limit line may be set based on a distance to the traffic light and a difference between the minimum available passing speed and a maximum available guidance speed, but is not limited thereto.

Figure 9:
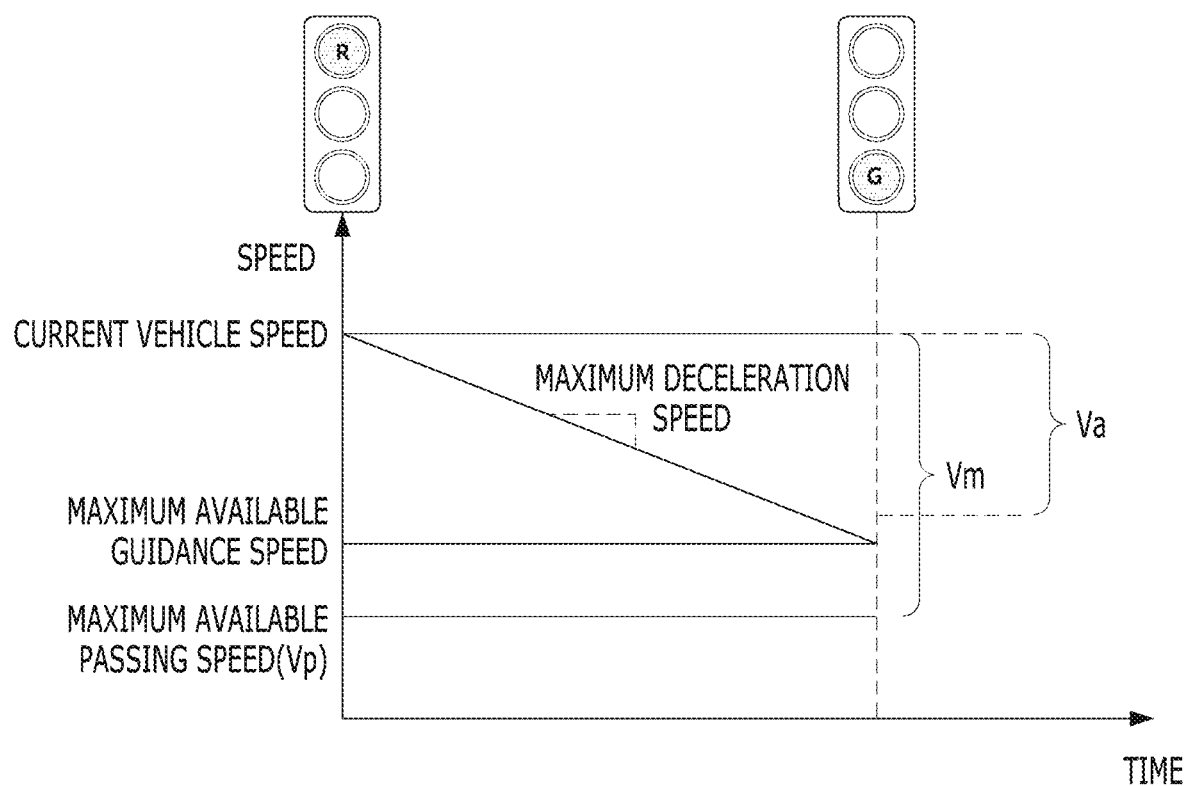
FIG. 9 is a diagram for explanation of the case in which a vehicle is not capable of crossing a traffic light without stopping when a forward signal is red.

FIG. 9 is a diagram for explanation of the case in which a vehicle is not capable of crossing a traffic light without stopping when a forward signal is red according to another form of the present disclosure.

Referring to FIG. 9, the minimum available guidance speed based on the maximum deceleration speed, that is, the available acceleration and deceleration speed Va is less than twice the margin speed Vm and the maximum available passing speed is smaller than a difference between the current vehicle speed and the maximum available deceleration speed and, thus, the guidance speed computation unit 227 may determine that the vehicle is not capable of crossing the traffic light without stopping. Here, the maximum deceleration speed may correspond to the case in which a lower value than an upper limit via brake force of the vehicle is applied. That is, the situation shown in FIG. 9 may not refer to the case in which a vehicle is not capable of stopping to a traffic light even if the vehicle decelerates with maximum brake force but, instead, may refer to the case in which an adjusted maximum deceleration speed is applied to prevent a deceleration speed at a level at which inconvenience is caused in surrounding vehicular traffic when the vehicle decelerates to the maximum available passing speed using maximum brake force.

In this case, the message for guiding deceleration may also be displayed on the cluster 241 described above with reference to FIG. 9 and, furthermore, coasting may be guided, which will be described with reference to FIG. 10.

Figure 10:
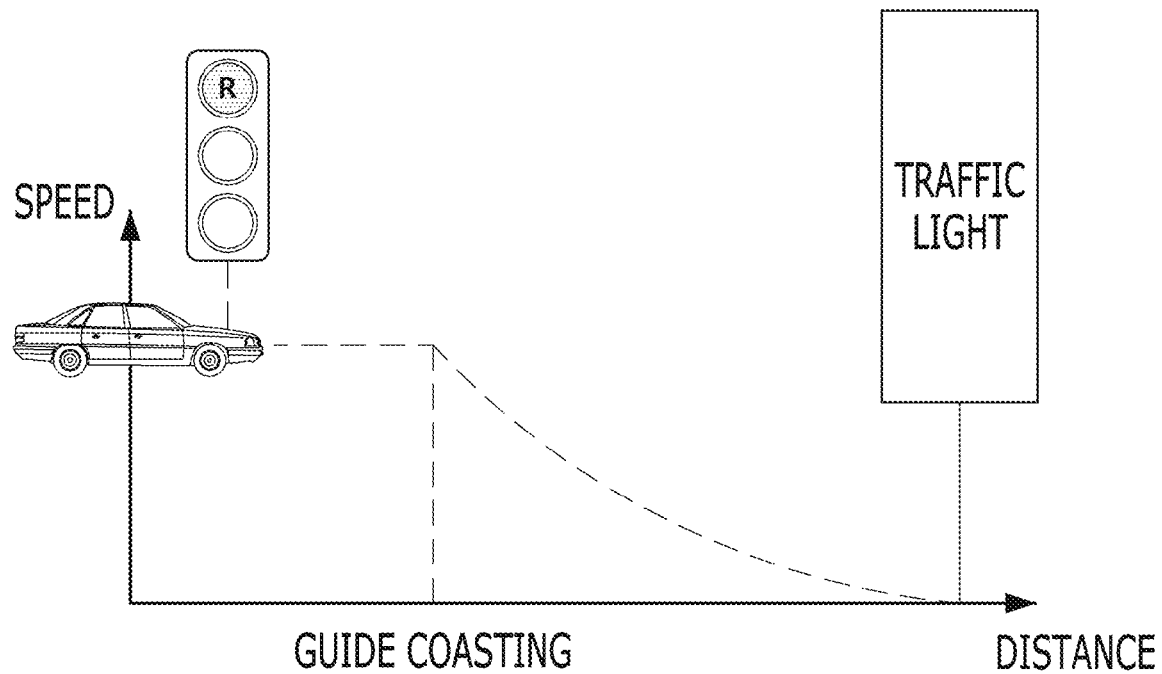
FIG. 10 is a diagram showing an example of the case of guidance of coasting.

FIG. 10 is a diagram showing an example of the coasting guidance according to one form of the present disclosure. Referring to FIG. 10, when a vehicle is not capable of crossing a traffic light without stopping, the vehicle may stop to the traffic light and, in this case, a time point of releasing an APS may be determined to reduce or minimize a loss in fuel efficiency and the output unit 240 may output an APS release signal when a corresponding time point is reached. In this case, the time point of releasing the APS may comply with a deceleration profile according to a road slope based on a current vehicle speed, a remaining distance to the traffic light, and map information. Technology of setting such deceleration profile is well known and, thus, a detailed description thereof is omitted for clarify of the specification.

According to the forms of the present disclosure that have been described thus far, unnecessary acceleration and deceleration may be reduced or minimized using traffic light information during driving. Accordingly, an effect of enhancing fuel efficiency may be expected and use of components of a driving system such as consumption of a brake pad may be reduced or minimized.

In the aforementioned forms, the case in which a vehicle is determined to be capable of crossing a traffic light without stopping when the available acceleration and deceleration speed Va is twice or more than the margin speed Vm has been described, but such magnification may be changed depending on cases and, thus, the magnification may be any preset multiple.

In addition, in the aforementioned forms, although a type of a traffic signal is classified into green and red, the present disclosure is not limited thereto and the type of the traffic signal may be classified into a signal for allowing a vehicle to proceed and an opposite signal.

The above configured vehicle related to at least one form of the present disclosure may determine whether a vehicle is capable of crossing a traffic light without stopping based on traffic light information and may guide a passing speed with the lowest loss in fuel efficiency, or may limit acceleration or may guide deceleration when the vehicle is not capable of crossing the traffic light without stopping, thereby enhancing fuel efficiency.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the present disclosures. Thus, it is intended that the present disclosure cover the modifications and variations of this present disclosure.

What is claimed is:

1. A method of controlling a vehicle, the method comprising:
   acquiring, by a communication unit, traffic light information of a forward traffic light ahead of the vehicle;
   determining, by a processor, whether the vehicle is able to pass through the forward traffic light without stopping the vehicle based on the traffic light information, a current vehicle speed of the vehicle, and available acceleration speed and deceleration speed of the vehicle; and
   when the vehicle is able to pass through the forward traffic light without stopping, outputting, by the processor, a guidance speed for enabling the vehicle to pass through the forward traffic light without stopping,
   wherein the forward traffic light information includes at least information on a current signal of the forward traffic light and an information on a remaining time until the current signal is changed to another signal indicating a change in a passability of the vehicle,
   wherein, when the current signal is a first signal based on which the vehicle is capable of driving, the determining step comprises:
   computing, by the processor, an available acceleration speed based on an accel eration force of the vehicle; and
   determining the guidance speed based on the available acceleration speed.

2. The method of claim 1, wherein the determining step further comprises:
- computing, by the processor, a minimum available passing speed as a minimum average speed for enabling the vehicle to pass without stopping, and a first margin speed computed based on the current vehicle speed and the minimum available passing speed; and
- determining the guidance speed based on a result of the computing.

3. The method of claim 2, wherein:
- the minimum available passing speed is computed by dividing a distance from a current position of the vehicle to the forward traffic light by the remaining time;
- the available acceleration speed is computed by multiplying a maximum acceleration speed by the remaining time; and
- the first margin speed is computed by subtracting the current vehicle speed from the minimum available passing speed.

4. The method of claim 2, further comprising: determining that the vehicle is able to pass the forward traffic light without stopping when the available acceleration speed is equal to or greater than a preset multiple of the first margin speed.

5. The method of claim 2, wherein determining the guidance speed includes:
- determining the guidance speed by selecting a greater value among the minimum available passing speed, and a sum of the minimum available passing speed and the first margin speed, and
- determining the minimum available passing speed as the guidance speed when the current vehicle speed is greater than the minimum available passing speed.

6. The method of claim 5, wherein, determining the guidance speed includes: when the current signal is a second signal based on which the vehicle is not capable of driving,
- computing a maximum available passing speed as a maximum average speed for enabling the vehicle to pass without stopping, an available deceleration speed based on deceleration force of the vehicle, and a second margin speed computed based on the current vehicle speed and the maximum available passing speed; and
- determining the guidance speed based on a result of the computing.

7. The method of claim 6, wherein the maximum available passing speed is computed by dividing a distance from a current position of the vehicle to the forward traffic light by the remaining time;
- the available deceleration speed is computed by multiplying a maximum deceleration speed by the remaining time; and
- the second margin speed is computed by subtracting the maximum available passing speed from the current vehicle speed.

8. The method of claim 6, wherein determining that the vehicle is able to pass the forward traffic light without stopping when the available deceleration speed is twice or more than the second margin speed.

9. The method of claim 6, wherein determining the guidance speed includes:
- determining a smaller value among the maximum available passing speed, and a value obtained by subtracting the second margin speed from the maximum available passing speed, as the guidance speed, and
- determining the maximum available passing speed as the guidance speed when the current vehicle speed is lower than the maximum available passing speed.

10. A non-transitory computer readable recording medium having a program recorded thereon, the program to direct a processor to perform acts of:
- acquiring, by a communication unit, traffic light information of a forward traffic light ahead of a vehicle;
- determining, by processor, whether the vehicle is able to pass through the forward traffic light without stopping the vehicle based on the traffic light information, a current vehicle speed of the vehicle, and available acceleration speed and deceleration speed of the vehicle; and
- when the vehicle is able to pass through the forward traffic light without stopping, outputting, by the processor, a guidance speed for enabling the vehicle to pass through the forward traffic light without stopping,
- wherein the forward traffic light information includes at least information on a current signal of the forward traffic light and an information on a remaining time until the current signal is changed to another signal indicating a change in a passability of the vehicle,
- wherein, when the current signal is a first signal based on which the vehicle is capable of driving, the determining step comprises:
- computing, by the processor, an available acceleration speed based on an acceleration force of the vehicle; and
- determining the guidance speed based on the available acceleration speed.

11. A vehicle comprising:
- a communication unit configured to acquire traffic light information on a forward traffic light ahead of the vehicle;
- a traffic signal processor configured to:
- determine whether the vehicle is able to pass through the forward traffic light without stopping the vehicle based on the traffic light information, a current vehicle speed of the vehicle, and available acceleration speed and deceleration speed of the vehicle, and
- determine a guidance speed for enabling the vehicle to pass through the forward traffic light without stopping; and
- an outputting unit configured to output the guidance speed,
- wherein the forward traffic light information includes at least information on a current signal of the forward traffic light and an information on a remaining time until the current signal is changed to another signal indicating a change in a passability of the vehicle,
- wherein, when the current signal is a first signal based on which the vehicle is capable of driving, the traffic signal processor is further configured to:
- wherein, when the current signal is a first signal based on which the vehicle is capable of driving, the traffic signal processor is further configured to:
- compute an available acceleration speed based on an acceleration force of the vehicle; and
- determine the guidance speed based on the available acceleration speed.

12. The vehicle of claim 11, wherein the traffic signal processor includes:
- a passing speed computation unit configured to compute a minimum available passing speed as a minimum average speed at which the vehicle passes without stopping when the current signal is a first signal indicative of allowing the vehicle to drive through the forward traffic light;

an acceleration speed and deceleration speed computation unit configured to compute an available acceleration speed based on acceleration force of the vehicle when the current signal is the first signal;

a margin speed computation unit configured to compute a first margin speed based on the current vehicle speed and the minimum available passing speed when the current signal is the first signal; and a guidance speed computation unit configured to determine the guidance speed based on the computed minimum available passing speed, the computed available acceleration speed, and the computed first margin speed.

13. The vehicle of claim 12, wherein:

the minimum available passing speed is computed by dividing a distance from a current position of the vehicle to the forward traffic light by the remaining time;

the available acceleration speed is computed by multiplying a maximum acceleration speed by the remaining time; and the first margin speed is computed by subtracting the current vehicle speed from the minimum available passing speed.

14. The vehicle of claim 12, wherein the traffic signal processor is configured to determine that the vehicle is able to pass the forward traffic light without stopping when the available acceleration speed is equal to or greater than a preset multiple of the first margin speed.

15. The vehicle of claim 12, wherein the guidance speed computation unit is configured to determine the guidance speed by selecting a greater value among the minimum available passing speed, and a sum of the minimum available passing speed and the first margin speed, and configured to determine the minimum available passing speed as the guidance speed when the current vehicle speed is greater than the minimum available passing speed.

16. The vehicle of claim 15, wherein, when the current signal is a second signal indicative of warning the passing through the forward traffic light, the passing speed computation unit is configured to compute a maximum available passing speed as a maximum average speed for enabling the vehicle to pass the forward traffic light without stopping, the acceleration speed and deceleration speed computation unit is configured to compute an available deceleration speed based on deceleration force of the vehicle, the margin speed computation unit is configured to compute a second margin speed depending on the current vehicle speed and the maximum available passing speed, and the guidance speed computation unit is configured to determine the guidance speed based on the computed maximum available passing speed, the computed available deceleration speed, and the computed second margin speed.

17. The vehicle of claim 16, wherein the maximum available passing speed is computed by dividing a distance from a current position of the vehicle to the forward traffic light by the remaining time;

the available deceleration speed is computed by multiplying a maximum deceleration speed by the remaining time; and the second margin speed is computed by subtracting the maximum available passing speed from the current vehicle speed.

18. The vehicle of claim 16, wherein the traffic signal processor is configured to determine that the vehicle is able to pass the forward traffic light without stopping when the available deceleration speed is twice or more than the second margin speed.

19. The vehicle of claim 16, wherein the guidance speed computation unit is configured to determine a smaller value among the maximum available passing speed, and a value obtained by subtracting the second margin speed from the maximum available passing speed, as the guidance speed, and configured to determine the maximum available passing speed as the guidance speed when the current vehicle speed is lower than the maximum available passing speed.

* * * * *